(12) United States Patent
Reilly (10) Patent No.: US 7,192,567 B1
(45) Date of Patent: Mar. 20, 2007

(54) PRECURSOR SOOT SYNTHESIS OF FULLERENES AND NANOTUBES WITHOUT FORMATION OF CARBONACEOUS SOOT

(75) Inventor: Peter T. A. Reilly, Knoxville, TN (US)

(73) Assignee: UT-Battelle LLC, Oak Ridge, TN (US)

( * ) Notice: Subject to any disclaimer, the term of this patent is extended or adjusted under 35 U.S.C. 154(b) by 460 days.

(21) Appl. No.: 10/105,518

(22) Filed: Mar. 25, 2002

Related U.S. Application Data

(63) Continuation-in-part of application No. 09/399,232, filed on Sep. 17, 1999, now Pat. No. 6,806,397.

(51) Int. Cl.
*D01F 9/12* (2006.01)
(52) U.S. Cl. ............................... 423/447.1; 423/447.3; 977/842
(58) Field of Classification Search ............. 423/447.1, 423/447.3; 977/DIG. 1, 842
See application file for complete search history.

(56) References Cited

U.S. PATENT DOCUMENTS

| 5,273,729 | A | 12/1993 | Howard et al. |
| 5,876,684 | A | 3/1999 | Withers et al. |
| 5,985,232 | A | 11/1999 | Howard et al. |
| 6,162,411 | A | 12/2000 | Howard et al. |
| 6,884,405 | B2 * | 4/2005 | Ryzhkov ................. 423/447.1 |

OTHER PUBLICATIONS

TH. Baum, S. Loffler, PH. Loffler, P. Weilmunster, & K.-H. Homann, "Fullerene Ions and Their Relation to PAH and Soot in Low-Pressure Hydrocarbon Flames," Phys. Chem. 96, 1992, pp. 841-850, 852, 854, 856-857, No. 7.
Henning Bockhorn (Ed.), "Soot Formation in Combustion," Mechanisms and Models, Springer-Verlag, Germany.
Timothy G. Benish, Arthur L. Lafeur, Koli Taghizadeh & Jack B. Howard, "C2H2 and PAH as Soot Growth Reactants in Premixed C2H4-Air Flames," The Combustion Institute, 1996, pp. 2319-2326.
Hongjie Dai, Andrew G. Rinzler, Pasha Nikolaev, Andreas Thess, Daniel T. Colbert, Richard E. Smalley, "Single-wall Nanotubes Produced by Metal-Catalyzed Disaproportionation of Carbon Monoxide," Chemical Physics Letters 260, 1996, pp. 471-475.
Richard A. Dobbins, Haran Subramaniasivan, "Soot Precursor Particles in Flames," Soot Formation and Combustion, pp. 291-301, Publ. Springer-Verlag, Germany.
Richard A. Dobbins, "The Early Soot Particle Formation in Hydrocarbon Flames," Physical and Chemical Aspects of Combustion, Ch. 5, pp. 107-133, Gordon and Breach Science Publishers, The Netherlands.
T. W. Ebbesen & P. M. Ajayan, "Large-scale Synthesis of Carbon Nanotubes," Nature, Jul. 16, 1992, pp. 220-222, vol. 358.
Andrei Kazakov, Hai Wang, and Michael Frenklach, "Detailed Modeling of Soot Formation in Laminar Premixed Ethylene Flames at a Pressure of 10 Bar," Combustion and Flame 100, 1995, pp. 111-120, Publ. Elsevier Science Inc.

U. O. Koylu, C. S. McEnally, D. E. Rosner, and L. D. Pfefferle, "Simultaneous Measurements of Soot Volume Fraction and Particle Size/Microstructure in Flames Using a Thermophoretic Sampling Technique," Combustion and Flame 110, 1997, pp. 494-507, Publ. Elsevier Science Inc.
H. W. Kroto, J. R. Heath, S. C. O'Brien, R. F. Curl & R. E. Smalley, "C60 Buckminsterfullerene," Nature, Nov. 1985, pp. 162-163, vol. 318.
H. W. Kroto & K. McKay, "The Formation of Quasi-Icosahedral Sprial Shell Carbon Particles," Nature, Jan. 1988, pp. 328-331, vol. 331.
Nikolaev, Pavel et al., "Gas-phase Catalytic Growth of Single-walled Carbon Nanotubes from Carbon Monoxide," Chemical Physics Letters 313, 1999, pp. 91-97.
W. G. Parker and H. G. Wolhard, "Carbon Formation in Flames," pp. 2038-2049.
Reilly, P. T. A. et al., "Fullerene Evolution in Flame-Generated Soot," J. Am. Chem. Soc, 2000, pp. 11596-11601, vol. 122, No. 47.
Reilly, P. T. A. et al., "Direct Observation of the Evolution of the Soot Carbonization Process in an Acetylene Diffusion Flame via Real-Time Aerosol Mass Spectrometry," Combustion and Flame 122, 2000, pp. 90-104.
Schlitter, R. R. et al., "Single-Crystals of Single-Walled Carbon Nanotubes Formed by Self-Assembly," Science, May 11, 2001, pp. 1136-1139, vol. 292.

(Continued)

*Primary Examiner*—Stuart Hendrickson
(74) *Attorney, Agent, or Firm*—Akerman Senterfitt; Neil R. Jetter (57) ABSTRACT

The present invention is a method for the synthesis of fullerenes and/or nanotubes from precursor soot without the formation of carbonaceous soot. The method comprises the pyrolysis of a hydrocarbon fuel source by heating the fuel source at a sufficient temperature to transform the fuel source to a condensed hydrocarbon. The condensed hydrocarbon is a reaction medium comprising precursor soot wherein hydrogen exchange occurs within the reaction medium to form reactive radicals which cause continuous rearrangement of the carbon skeletal structure of the condensed hydrocarbon. Then, inducing dehydrogenation of the precursor soot to form fullerenes and/or nanotubes free from the formation of carbonaceous soot by continued heating at the sufficient temperature and by regulating the carbon to hydrogen ratio within the reaction medium. The dehydrogenation process produces hydrogen gas as a by-product. The method of the present invention in another embodiment is also a continuous synthesis process having a continuous supply of the fuel source. The method of the present invention can also be a continuous cyclic synthesis process wherein the reaction medium is fed back into the system as a fuel source after extraction of the fullerenes and/or nanotube products. The method of the present invention is also a method for producing precursor soot in bulk quantity, then forming fullerenes and/or nanotubes from the precursor bulk.

16 Claims, 8 Drawing Sheets

OTHER PUBLICATIONS

Singh, Himmat et al., "Fullerenes: Synthesis, Separation, Characterization, Reaction Chemistry, and Applications—A Review," Energy Sources, pp. 615-640, vol. 17.

Sweitzer, C. W. et al., "The Formation of Carbon Black in Hydrocarbon Flames," Rubber World, Sep. 1956, pp. 855-865.

Taylor, Roger et al., "Formation of C60 by Pyrolysis of Naphthalene," Nature, Dec. 1993, pp. 728-731, vol. 366.

Smalley, Richard E. et al., PCTInternational Publication WO 00/261388, "Gas-Phase Nucleation and Growth of Single-Wall Carbon Nanotubes from High Pressure CO".

* cited by examiner

PRECURSOR SOOT SYNTHESIS OF FULLERENES AND NANOTUBES WITHOUT FORMATION OF CARBONACEOUS SOOT

CROSS-RELATED APPLICATIONS

The present application is a continuation-in-part application to U.S. application Ser. No. 09/399,232 filed Sep. 17, 1999 now U.S. Pat. No. 6,806,397, incorporated herein by reference.

The invention was made with government support under contract no. DE-AC05-00OR22725 awarded by the United States Department of Energy to UT-Battelle, LLC.; and the government has certain rights in the invention.

FIELD OF THE INVENTION

The present invention relates to a method for the synthesis of fullerenes and nanotubes, particularly a method for the synthesis of fullerenes and nanotubes from precursor soot without the formation of mature, carbonaceous soot.

BACKGROUND OF THE INVENTION

Kroto et.al. in 1985 (*Nature*, Vol. 318 no. 14, 1985) discovered that laser vaporization of carbon into flowing helium gas results in formation of a new form of carbon, a compound having the composition $C_{60}$. The new $C_{60}$ molecule was named "Buckminsterfullerene", or "Buckyball" in honor of its almost spheroidal shape, and is a closed truncated icosahedron of carbon atoms, formed from fused five and six-membered aromatic rings.

Subsequent research (Kroto et. al., *Nature*, 1988) showed that a much larger family of hollow carbon-cage cluster species generically termed "fullerenes" can be generated from carbon-containing substrates. Large closed-cage fullerenes of formulas including $C_{70}$, $C_{120}$, $C_{130}$, $C_{140}$, $C_{180}$, and $C_{240}$ are believed to exist. Other fullerenes with open (i.e., not closed) carbon cages also exist. U.S. Pat. No. 5,876,684 to Withers et.al. is an example of a method and apparatus for producing fullerenes. Other workers have reported formation of fullerenes from vapor phase pyrolysis of napthalene at temperatures of about 1000° C. (see Taylor et.al., *Nature*, 1993).

Research has also shown (Ebbesen et.al., *Nature*, 1992) that the family of fullerenes includes hollow graphitic tubules whose dimensions are on the order of nanometers. These hollow graphic tubules have walls formed from sheets of fused six-membered rings. The walls of the nanotubes may comprise many concentric layers of the graphitic sheets, or may have a single layered wall.

Fullerene-type ions and molecules have also been spectroscopically detected in the vapor phase of sooting flames. Fullerenes have also been extracted from soot.

Fullerenes and nanotubes have a variety of uses, including use as superconductors, photo-conductors, micro-lubricants, catalysts, catalyst supports, electrodes for batteries, adsorbents, hydrogen storage media, plant-growth regulators, and pharmaceuticals. In response to such uses, a variety of methods for synthesizing, characterizing and purifying fullerenes and nanotubes have been developed (Srivastava, *Energy Sources*, 1995). Nevertheless, the yields of fullerenes and nanotubes remain low, and cost of producing and purifying fullerenes remains extremely high, which has significantly limited the commercial viability of many potential applications.

Since the discovery of fullerenes in 1985 by Kroto et al., fullerenes have been the focus of a vast amount of research. One of the fundamental problems with the synthesis of fullerenes is the co-production of soot (i.e., mature soot and/or amorphous carbon, carbonaceous soot) requiring tedious, expensive and wasteful procedures for purification of the product. Much has been done to alleviate this problem for catalytically produced carbon nanotubes. For example, Smalley et al. used disproportionation of high-pressure carbon monoxide over narrowly dispersed catalyst particles to produce reasonably pure nanotubes (Dal et al., 1996). The Smalley et. al. high-pressure carbon monoxide process occurs at the gas-solid interface. More recently, Schlittler et al. (*Science*, 2001) used thermolysis of nano-patterned layers of $C_{60}$ and Ni to produce single crystals of nanotubes with identical diameters and lengths. Given the quantity of research on buckminsterfullerene, it is lamentable that little progress has been made to advance the production of $C_{60}$ without the production of soot or amorphous carbon. The lack of an economic method for producing $C_{60}$ is especially regrettable in light of Schlittler et al.'s new method for producing single crystals of nanotubes from $C_{60}$.

The chemistry of flame combustion and the process of soot formation in flames have been investigated. For example, it is known that polycyclic aromatic hydrocarbons (PAHs) are formed in flames, and that the polycyclic aromatic hydrocarbons may be precursors of soot in flames. PAHs are a large class of hydrocarbon compounds having fused five and/or six membered aromatic ring residues. A list of about 622 known polycyclic hydrocarbons has been tabulated by Sanders and Wise of the National Institute of Standards and Technology, in NIST Special Publication 922, available at inter-alia, the NIST website.

Polycyclic hydrocarbons initially and predominantly grow in the vapor phase of a flame by step-wise condensation of two carbon fragments. PAH compounds with even numbers of carbon atoms, comprising planar arrays of fused six-membered benzene residues are believed to predominate over PAH compounds with odd numbers of carbon atoms or five-membered rings in flames, because of differences in thermodynamic stability.

Baum et.al. in 1992 suggested that fullerenes may form by coagulation or condensation of PAH molecules with other PAH molecules or immature soot particles.

For the past fifty years and more, theories of soot formation have been based on the chemistry of the gas phase. The most probable reason for this approach is that most hydrocarbon precursors are gases at the temperatures where soot is formed. However, there is a form of hydrocarbon that does exist in the condensed phase under these high temperature conditions called precursor soot. Unfortunately, the very existence of this material has been shrouded in controversy and has resulted in many strange ideas for the process of soot formation.

Though reference cannot be found in the literature, the controversy likely stems from the composition of precursor soot. In general, the composition of precursor soot can be described by two extractable fractions, the aromatic and tar fractions. The aromatic fraction is primarily composed of free polycyclic aromatic hydrocarbons (PAHs) as defined by chromatographic and mass spectrometric analysis. The tar fraction is composed of aromatic and aliphatic hydrocarbons as defined by spectroscopic analysis (IR and NMR). The controversy arises from the physical properties of the free PAHs; their boiling points are much lower than the temperatures where precursor soot is formed. Since no species can physically condense when its equilibrium vapor pressure is greater than the pressure of the surrounding environment, it can incorrectly be concluded that this oil only condenses during the sampling process. Consequently, unsupported and mostly unpublished explanations for the existence of precursor soot abound.

Evidence of precursor soot in flames was observed and reported by Parker and Wolfhard in 1950. Definitive evidence for the existence of precursor soot was demonstrated by the carbon black industry as reported in 1956 by Sweitzer and Heller. They observed a white mist (micron-sized particles) develop in their furnace. Sampling and chemical analysis of the white mist showed it to be an oil of PAHs. Further heating of the white mist produced soot. Their work proved that a high-temperature stable form of liquid hydrocarbon (precursor soot) could be produced by fuel pyrolysis.

OBJECTS OF THE INVENTION

Accordingly, it is an object of the present invention to provide a method for the production of precursor soot without the formation of carbonaceous soot.

It is a further object of the present invention to provide a method for the synthesis of fullerenes and/or nanotubes from precursor soot without the formation of carbonaceous soot.

It is yet a further object of the present invention to provide a method for the continuous synthesis of fullerenes and/or nanotubes from precursor soot without the formation of carbonaceous soot.

It is still another object of the present invention to provide a method for the production of precursor soot in bulk quantity without the formation of carbonaceous soot.

Further and other objects of the present invention will become apparent from the description contained herein.

SUMMARY OF THE INVENTION

In accordance with one aspect of the present invention, the foregoing and other objects are achieved by a method for synthesizing fullerenes and/or nanotubes from precursor soot without the formation of carbonaceous soot. The method comprises the steps of first providing a fuel source comprising a hydrocarbon having at least one carbon. Then, secondly, pyrolyzing the fuel source by heating it at a sufficient temperature to transform the fuel source to a condensed hydrocarbon. The condensed hydrocarbon is a reaction medium comprising precursor soot wherein hydrogen exchange occurs within therein to form reactive radicals which cause continuous rearrangement of the carbon skeletal structure of the condensed hydrocarbon. Thirdly, inducing dehydrogenation of the precursor soot to form fullerenes and/or nanotubes free from the formation of carbonaceous soot by continued heating at the sufficient temperature and by regulating the carbon to hydrogen ratio within the reaction medium. The dehydrogenation process produces hydrogen gas as a by-product.

In accordance with another aspect of the present invention, other objects are achieved by a method for the continuous synthesis of fullerenes and/or nanotubes from precursor soot without the formation of carbonaceous soot. The method of this embodiment comprises the steps of first providing a continuous feedstock flow stream comprising a continuous supply of a hydrocarbon fuel source having at least one carbon. Secondly, pyrolyzing the fuel source by heating at a sufficient temperature to transform the fuel source to a condensed hydrocarbon. The condensed hydrocarbon being a reaction medium comprising precursor soot wherein hydrogen exchange occurs within the reaction medium to form reactive radicals which cause continuous rearrangement of the carbon skeletal structure of the condensed hydrocarbon. Then, thirdly, inducing dehydrogenation of the precursor soot to form fullerenes and/or nanotubes free from the formation of carbonaceous soot by continued heating at the sufficient temperature and by regulating the carbon to hydrogen ratio within the reaction medium. The dehydrogenation process produces hydrogen gas.

In accordance with yet another aspect of the present invention, other objects are achieved by a method for the synthesis of precursor soot in bulk quantity without the formation of carbonaceous soot. The method of this embodiment comprises the steps of first providing a fuel source comprising a hydrocarbon having at least one carbon. Then, pyrolyzing the fuel source by heating at a sufficient temperature to transform the fuel source to a condensed hydrocarbon. The condensed hydrocarbon being a reaction medium comprising precursor soot wherein hydrogen exchange occurs within the reaction medium to form reactive radicals which cause continuous rearrangement of the carbon skeletal structure of the condensed hydrocarbon. The precursor soot formed is free from the formation of carbonaceous soot.

For a better understanding of the present invention, together with other and further objects, advantages and capabilities thereof, reference is made to the following disclosure and appended claims in connection with the above-described drawings.

DETAILED DESCRIPTION OF THE INVENTION

The present invention may be understood more readily by reference to the following detailed description of preferred embodiments of the invention and the Example included therein and to the Figures and their previous and following description.

Ranges are often expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

The term "alkyl" as used herein refers to a branched or unbranched saturated hydrocarbon group of 1 to 24 carbon atoms, such as methyl, ethyl, n-propyl, isopropyl, n-butyl, isobutyl, t-butyl, octyl, decyl, tetradecyl, hexadecyl, eicosyl, tetracosyl and the like. Preferred alkyl groups herein contain from 1 to 12 carbon atoms. The term "lower alkyl" intends an alkyl group of from one to six carbon atoms, preferably from one to four carbon atoms. The term "cycloalkyl" intends a cyclic alkyl group of from three to eight, preferably five or six carbon atoms.

The term "alkylene" as used herein refers to a difunctional saturated branched or unbranched hydrocarbon chain containing from 1 to 24 carbon atoms, and includes, for example, methylene (—$CH_2$—), ethylene (—$CH_2$—$CH_2$—), propylene (—$CH_2$—$CH_2$—$CH_2$—), 2-methylpropylene (—$CH_2$—$CH(CH_3)$—$CH_2$), hexylene (—$(CH_2)_6$—) and the like. "Lower alkylene" refers to an alkylene group of from 1 to 6, more preferably from 1 to 4, carbon atoms. The term "cycloalkylene" as used herein refers to a cyclic alkylene group, typically a 5- or 6-membered ring.

The term "alkene" as used herein intends a mono-unsaturated or di-unsaturated hydrocarbon group of 2 to 24 carbon atoms. Preferred groups within this class contain 2 to 12 carbon atoms. Asymmetric structures such as (AB)C=C(CD) are intended to include both the E and Z isomers. This may be presumed in structural formulae herein wherein an asymmetric alkene is present, or it may be explicitly indicated by the bond symbol.

The term "aromatic" as used herein intends a carbonaceous or hydrocarbon compound having within the compound a cyclic residue of five to eight carbon atoms, which has a conjugated array of double bonds around the ring. Most aromatic rings contain 4n+2 Π electrons, as contributed by the carbon or other atoms of the ring, wherein n is zero or a positive integer. For example, napthalene contains two fused six membered benzene residues, with a conjugated array of double bonds around each ring. Moreover, each benzene residue of the overall napthalene ring structure has six carbon atoms, each carbon atom contributing one Π electron to the conjugated array of double bonds in the ring residue. Therefore, napthalene is an aromatic compound under the instant definition. Similarly, indene, $C_9H_8$, which has a cyclopentene residue fused to a benzene residue, is aromatic because of the benzene residue. Moreover, an indenyl anion, $C_9H_7^-$, has the structure of indene, except that a hydrogen nucleus has been removed from the cyclopentene ring, without removal of the associated electron. An indenyl anion is aromatic both because of its benzene residue, and its cyclopentadienyl residue, both of which contain six Π electrons. Aromatic compounds include heterocyclic aromatic compounds, such as pyridine, furan, and the like.

The present invention is a new method for the precursor soot synthesis of fullerenes and/or nanotubes that does not produce amorphous carbon or carbonaceous soot (mature soot). $C_{60}$ was produced in the liquid phase of an aerosol of precursor soot at 700° C. The precursor soot aerosol, a high temperature stable form of hydrocarbon, was produced by pyrolysis of pure acetylene at atmospheric pressure in a flow tube reactor. The filter-collected effluent was shown to be completely soluble in conventional solvents, suggesting the possibility of an efficient cyclic process.

Fullerenes were only found in the particle phase implying the first observed liquid phase synthesis of $C_{60}$. Precursor soot is an excellent synthetic medium (reaction medium) for the production of fullerenes and nanotubes. Addition of suitable catalysts to the synthetic precursor soot medium results in the production of nanotubes also without the production of amorphous carbon or mature soot or carbonaceous soot. The synthetic precursor soot medium is a high-temperature-stable hydrocarbon liquid. The method of the present invention allows the synthetic precursor soot medium (reaction medium) to be recycled to make more precursor soot. Nanotubes produced in the synthetic medium could readily be formed into fibers, doped or otherwise manipulated to form useful materials.

A polycyclic aromatic hydrocarbon is defined for the purposes of this invention as a compound having more than 6 carbon atoms bonded to form at least two rings, and at least one carbon-hydrogen bond; and wherein at least one of the rings is an aromatic ring. Although PAH compounds typically contain only carbon and hydrogen atoms, in some embodiments a PAH may also contain one or more heteroatoms, such as nitrogen, oxygen, sulfur, halides, or metals. Main group heteroatoms such as nitrogen, oxygen, sulfur may be incorporated into the ring structure of the PAH, or be present as a peripheral substituent group bonded to a carbon atom of a ring. PAH compounds also form complexes to certain metals, particularly transition metals, lanthanide metals, and actinide metals. An otherwise suitable PAH compound is not excluded from the class of PAHs merely because of the presence of a complexed metal.

In the methods of the present invention, the condensed phase comprises a liquid phase or a mixture of a liquid phase and a solid phase. The condensed phase may also comprise a solid phase, a liquid phase and a gaseous phase wherein hydrogen gas is a product of the synthesis process. The condensed phase may comprise a liquid phase over a wide range of temperatures. The condensed phase is a phase wherein hydrogen exchange is occurring to form radicals which cause a rearrangement of the carbon skeletal structure of the carbon-containing material, defining the condensed phase as a reaction medium where fullerenes and nanotubes are formed upon dehydrogenation. This reaction medium comprises a liquid phase at temperatures ranging from about 300° C., up to about 1200° C. In more preferred embodiments, the condensed phase may comprise a liquid phase at temperatures ranging from about 600° C., up to about 800° C.

The condensed phase may also comprise a plurality of particles. The particles may comprise a liquid phase, a solid carbonaceous phase or a mixture of a solid phase and a liquid phase. If the particles predominantly comprise a solid phase, the particles may have a substantially fixed and stable size, and a regular or an irregular shape.

In the methods of the subject invention, at least some of the particles comprise relatively large amounts of the liquid phase, relatively small amounts of a solid carbonaceous phase, and need not have a substantially fixed or stable size and shape. These "liquid-like" particles are termed "immature" soot particles or precursor soot.

Soot is sometimes described in the art as "mature soot" or carbonaceous soot. Soot is typically an aggregate of solid carbonaceous materials, which are typically substantially insoluble in organic solvents, and contain only insignificant quantities of PAH compounds or hydrogen atoms. These soot particles may comprise fractal aggregations of smaller monodispersed, approximately spherical carbonaceous particles. "Mature soot" is to be contrasted with the "immature" particles of the invention, as described below and herein.

The carbon-containing material is a hydrocarbon fuel source that is condensed by pyrolysis to form a reaction medium comprising precursor soot. Dehydrogenation of the precursor soot to form fullerenes and/or nanotubes occurs in the reaction medium. In preferred embodiments, the carbon-containing material comprises a $C_1$–$C_{18}$ hydrocarbon, or a $C_2$–$C_{15}$ hydrocarbon. In highly preferred embodiments, the carbon-containing material comprises a $C_2$–$C_{12}$ hydrocarbon. The hydrocarbons may contain heteroatoms such as oxygen, nitrogen, or sulfur, although hydrocarbons containing only carbon and hydrogen are preferred. The hydrocarbons may be a substituted or unsubstituted, branched or unbranched compound comprising an alkane, an alkene, an alkyne, an aromatic compound, or a mixture thereof. Alkene, alkyne, and aromatic hydrocarbons are preferred.

The carbon-containing material may also comprise a wide variety of naturally occurring and man-made substances, including natural gas, petroleum, and petrochemical derivatives thereof; wood, coal, charcoal, graphite, other carbon-containing materials derived from plants or animals; or waste or waste products derived from waste reclamation activities. Preferably, the carbon-containing material is combustible in the presence of oxygen, and does not comprise non-combustible compounds such as carbon dioxide, carbonates, highly halogenated carbon compounds, and the like. The carbon-containing material may also include carbonaceous soot.

Fullerenes are defined as polycyclic compounds having a non-planar carbon skeleton comprising twenty or more carbon atoms, bonded to form fused five and/or six membered rings, wherein at least one of the rings is aromatic. Fullerenes may have either even or odd numbers of carbon atoms, and may contain hydrogen atoms.

The fullerene is preferably a polycyclic compound having a non-planar carbon skeleton comprising fused five and/or six membered aromatic rings, having the formula $C_{20+2m}$, where m is 0 or a positive integer. Fullerenes within this definition may have an open carbon shell or cage, but preferably have a closed carbon shell or cage. The fullerene is more preferably a $C_{60}$ compound having a carbon skeleton in the form of a closed truncated polyhedron of sixty vertices, or a $C_{70}$ compound having a closed carbon skeleton of seventy vertices.

Nanotubes are substantially hollow tubules having walls composed of closed cylindrical sheets of hexagonally arrayed carbon atoms. Nanotubes are a subset of the more general class of fullerenes. The carbon atoms of the walls of the nanotubes may be bonded to small amount of hydrogen or other heteroatoms. Typically, the cylindrical sheets have diameters ranging from a fraction of a nanometer, up to about 500 nanometers. Preferably, the cylindrical sheets have diameters from about 0.3 nanometers up to about 50 nanometers. The lengths of the tubules may vary over a wide range, ranging upward about 1 nanometer. Longer tubule lengths are generally preferred, and continuous "thread-like" tubules of macroscopic lengths (or larger) are most preferred. Preferably, the minimum lengths of the tubules range from about 10 nanometers, from about 1 micrometer, or from about 1 millimeter. As is known in the art, nanotubes may or may not have approximately hemispherical carbon "caps" comprising residues resembling other fullerenes attached at one or both ends of the tubules.

Preferably, the hexagonally arrayed carbon atoms of the tubule walls from fused six-membered rings which are aromatic, contain little or no hydrogen or other heteroatoms; and therefore the cylindrical sheets are graphitic in character. In some preferred embodiments, the nanotube comprises a hollow graphite tubule. In some preferred embodiments, the hollow tubule has from about 1 to about 50 concentric cylindrical sheets of hexagonally arranged carbon atoms. Alternatively, the hollow graphite tubule has a wall with only a single sheet of hexagonally arranged carbon atoms.

In certain embodiments, at least some of the ring residues of the fullerenes or nanotube are partially hydrogenated, and the fullerenes or nanotube therefore contains hydrogen. In alternatively preferred embodiments, the partially hydrogenated fullerene or nanotube is a polycyclic compound having a non-planar carbon skeleton comprising fused five and/or six membered aromatic rings, having the formula $C_{20+2m}H_n$, where m is 0 or a positive integer, and n is less than m.

The heating step induces pyrolysis of the carbon-containing material, pyrolyzing the carbon-containing fuel source to form a condensed phase. The condensed phase as previously mentioned comprises a solid phase, a liquid phase or a combination thereof. Precursor soot is formed upon pyrolysis and becomes the reaction medium for the formation of fullerenes and nanotubes. Dehydrogenation occurs in the reaction medium. Hydrogen gas is produced as a product of the dehydrogenation process. The heating step preferably occurs in a suitable reactor. The heating step may occur over periods of time as short as milliseconds or over longer time periods, such as one second, one minute, one or more hours or even one or more days. Longer reaction times are often beneficial in that they may produce higher yields, greater purity and lower levels of structural defects in fullerenes and nanotubes.

In certain embodiments, the heating step can occur in the presence of a catalyst, which improves the rate or selectivity of the formation of fullerenes and/or nanotubes. Preferred catalysts include a metal or a metal compound. Preferred metals include transition metals, lanthanide metals, and transition metals. Preferred transition metals or metal compounds comprise Ti, Zr, Hf, V, Nb, Ta, Cr, Mo, W, Mn, Re, Fe, Ru, Os, Co, Rh, Ir, Ni, Pd, or Pt, Zn, Cu, or Hg. The most preferred transition metals or metal compounds comprise Fe, Ru, Os, Co Rh, Ir, Ni, Pd, or Pt. Preferred metal compound catalysts are metallocene or metal carbonyl compounds of the above-described metals. Metallocene catalyst compounds have a metal atom coordinated to at least one aromatic hydrocarbon ligand. Preferred metallocene catalysts compounds have aromatic hydrocarbon ligands comprising a cyclopentadieynl or benzene residue. Ferrocene, $Fe(C_5H_5)_2$; and chromocene, $Cr(C_6H_6)_2$ are non-exhaustive examples of preferred metallocene catalyst compounds. Metal carbonyl catalyst compounds have a metal atom coordinated to at least carbon monoxide ligand. Iron pentacarbonyl, $Fe(CO)_6$, iron dodecacarbonyl, $Fe_3(CO)_{12}$; and cobalt octacarbonyl, $Co_2(CO)_8$; are non-exhaustive examples of preferred metal carbonyl catalyst compounds.

In some embodiments of the present invention, a catalyst is introduced into the precursor soot synthesis process either before, during or after the formation of the condensed phase reaction medium. The catalyst undergoes pyrolysis to form nanoparticles of the metal. These metallic nanoparticles provide a surface for nanotubes to grow. The size of the metallic nanoparticle affects the structure of the nanotubes. For instance, larger metallic nanoparticles produce multi-walled nanotubes and smaller metallic nanoparticles produce single-walled nanotubes. Another embodiment includes the addition of nanoparticles of metal or the addition of nanoparticles of metal already on a surface, adding directly to the precursor soot reaction medium which then provide a surface for nanotubes to grow.

In some embodiments of the present invention, the precursor soot synthetic method for producing fullerenes and/or nanotubes is a continuous flow process having a continuous feedstock flow stream containing a carbon-containing material as a fuel source, which is continually supplied to feed the synthesis process. The process continually forms precursor soot and fullerenes and/or nanotubes with the production of hydrogen gas as long as there is a continuous feed of carbon-containing material in the feedstock flow stream, to feed the process. The remainder of the liquid reaction medium after extraction of the fullerenes and/or nanotubes can be reintroduced into the feedstock flow stream.

The fullerene and nanotube products produced by the processes may be purified by standard methods known to those of skill in the art. Such methods of purification include extraction, chromatography, sublimation, and the like.

Fullerenes (i.e., nanotubes, $C_{60}$, etc.) are more thermodynamically stable than soot because of the lack of "dangling bonds" (described by Smalley, 1992), as "Dangling bonds" are inherent in soot. Moreover, the same process creates both soot and fullerenes, namely rearrangement of the carbon bond structure with concurrent loss of the non-carbon species that make up the reactant. The real difference in the processes for producing soot and fullerenes is the time period where carbon rearrangement is energetically feasible. In other words, fullerenes are produced when the carbon bonds have enough time to rearrange themselves into the higher order yet thermodynamically lower energy state. Lack of sufficient time for rearrangement leaves the carbon structure in a state of much more random order and higher thermodynamic energy, hence the production of mature or carbonaceous soot.

Because fullerenes are more thermodynamically stable than soot, there must be a reason that soot does not immediately convert to fullerenes upon annealing at the same temperatures where the fullerenes are produced. In the case of low temperature pyrolysis of hydrocarbons to produce fullerenes (<1000° C.), depletion of the leaving group (hydrogen) leaves the carbon structure frozen. Without the presence of hydrogen, rearrangement would require the creation of too many "dangling bonds" to produce fullerenes. Consequently, if a system can be found where carbon rearrangement occurs and the concentration of leaving group species can be intimately controlled, and then fullerenes could be produced without producing carbonaceous soot. The present invention is such a system wherein the hydrogen concentration in the reaction medium is controlled by the process parameters such as temperature in the heating step, carbon to hydrogen ratio of the feedstock and partial pressure of hydrogen above the reaction medium.

The method of the present invention comprises the soot-free production of $C_{60}$ in the liquid phase of an aerosol of precursor soot by controlling the carbon rearrangement process. Analysis of the effluent medium shows that is made up of readily soluble liquid hydrocarbon species (precursor soot) that can be recycled back into the production of precursor soot. Thus, the method of the present invention is a method for producing fullerenes and/or nanotubes in a cyclic process that reuses the hydrocarbon products and thereby improving the efficiency of the overall process. Just as importantly, the product fullerenes and/or nanotubes are produced in a liquid medium so that the product is easily manipulated and purified. Precursor soot is produced from the pyrolysis of any hydrocarbon fuel under the appropriate conditions. The method of the present invention can be used to produce bulk quantities of precursor soot, which is an excellent synthetic medium for the production of fullerenes. Addition of metal catalysts to the aerosol precursor soot reaction medium or to the bulk collected precursor soot reaction medium produces nanotubes without producing amorphous carbon or carbonaceous soot.

Precursor soot as its name implies is an integral step in the production of mature soot. Conversion of precursor soot into mature soot occurs by rapid loss of hydrogen with concurrent rearrangement of the carbon skeletal structure. Precursor soot is formed during the pyrolysis of any hydrocarbon species. First, the hydrocarbon fuel species pyrolyze to form gas phase polycyclic aromatic hydrocarbons (PAHs) through the stepwise addition of two and three carbon-containing species (Bockhorn, 1994). Under the right conditions, the PAHs chemically condense to form three-dimensional nanoparticles with some very unusual properties. At the temperatures where these particles form, the hydrocarbon species that compose the particles rapidly exchange hydrogen (Reilly et al., 2000). As a consequence of this exchange process, a large concentration of free radicals is formed. These free radicals permit rapid particle growth by hydrocarbon addition. They also permit rapid and continuous rearrangement of carbon structure inside the particle that accounts for the observed liquid nature of the precursor soot. Consequently, precursor soot droplet coalescence to form larger singlet particles is another mechanism for rapid particle growth and helps explain the ability of the precursor soot to grow to micrometer sizes on millisecond timescales.

Precursor soot is an ideal medium for fullerenes and nanotube growth because it is essentially a mass of reacting free radicals that are continuously rearranging their carbon skeletal structure at high temperature. Because of the radical nature of the precursor soot at high temperature, the hydrogen concentration is in equilibrium between the particle and gas phases. Precursor soot at lower temperatures, when cooled, becomes an oil of PAHs and small hydrocarbons. Therefore, it is possible to regulate or control the hydrogen concentration in the precursor particle phase by controlling the hydrogen concentration in the gas phase, thereby controlling the partial pressure of hydrogen. The hydrogen to carbon ratio of the precursor soot synthetic reaction medium can also be adjusted by changing the hydrogen to carbon ratio of the feed stock or by adding a quantity of oxidant such as $O_2$. Moreover, the concentration of hydrogen in the particle phase can be optimized to yield the best reaction conditions. The preferred reaction conditions that optimally produces the desired fullerenes and/or nanotubes without the production or formation of carbonaceous soot is such that the synthetic process operates at about 700° C. The carbon to hydrogen ration can also be controlled with the addition of carbon-containing materials to the reaction medium.

EXAMPLE 1

Precursor soot was produced when pure acetylene at atmospheric pressure was passed through a 3.85 mm ID 45 cm long quartz flow tube reactor at a constant temperature of 700° C. and 800° C. in two separate experiments. The flow through the reactor was laminar at a 40 ml/min flow rate. Immediately upon exiting the reactor, the effluent was rapidly diluted one hundred fold with a 4 l/min flow of pure room temperature nitrogen. A portion of the diluted effluent was directly sampled into an ion trap-based aerosol mass spectrometer. The configuration of this instrument is described by Reilly et. al, Combust. Flame 122–90 (2000), incorporated herein by reference.

Particle mass spectra were obtained by ablating each individual particle in real time as it passed through the ion trap with a focused pulse from a 308 nm excimer laser (~1 J/cm$^2$). Gas phase mass spectra of the diluted effluent were obtained with the 308 nm laser whenever the laser "missed" the particle. The composition of the gas phase was checked by deliberately mistiming the laser to miss the particles as they passed through the trap. The compositions of the gas phase was also examined by electron impact (EI) ionization with an ion collection time of 500 ms. The laser and electron impact mass spectra were comparable with the EI spectra showing subtle differences primarily in the degree of hydrogenation.

The diluted effluent was collected on hydrophobic polyvinylidene fluoride membrane filters (Millipore, 0.22 μm pore size) for further off-line analysis. The effluent was extracted from the filter with methylene chloride. The extractant was analyzed by several techniques. Gas Chromatograph/mass spectrometry (GCMS) was used to identify the low mass components (<300 Da). Laser desorption/ionization mass spectrometry (LDMS) was used to evaluate the high mass components (>300 Da). The extracted effluent was also deposited on C18 coated 5 μm silica beads by solvent evaporation. These beads are standard packing for liquid chromatography columns. The beads were analyzed individually with the aerosol mass spectrometer by sprinkling them over the inlet thus yielding a direct comparison between real-time and off-line particle analysis.

The pyrolysis of acetylene at 700° C. yielded no black particulate matter in the effluent. After extraction with methylene chloride, the filter returned to its original white color. No solid matter was suspended in the extractant. Black particulate matter was found in the extract and on the filter of the effluent collected from pyrolysis at 800° C.

Figure 1:
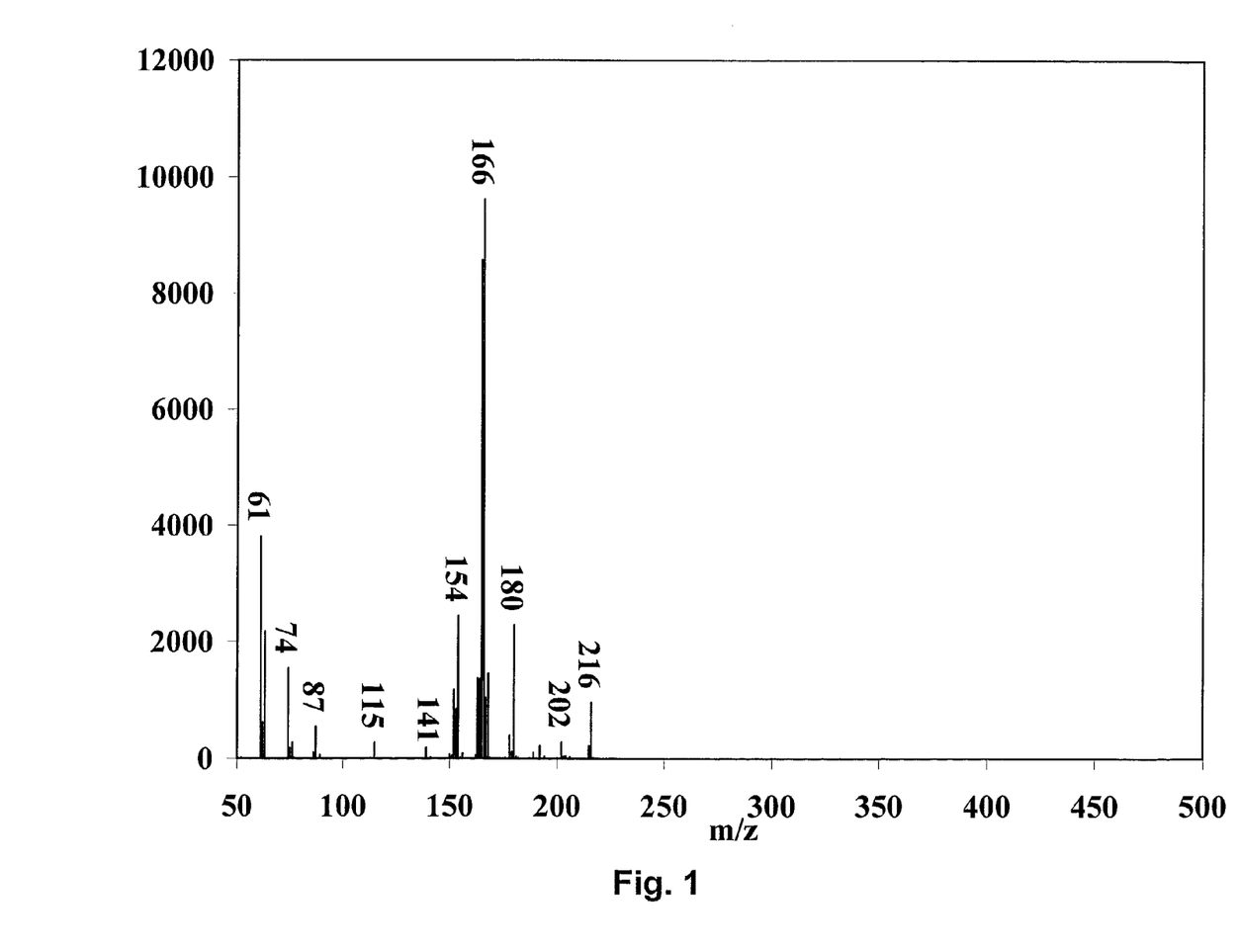
FIG. 1 shows the averaged mass laser ionization mass spectrum of the gas phase species obtained by deliberately mistiming the laser to avoid hitting the effluent particles from 501 laser shots.
Figure 2:
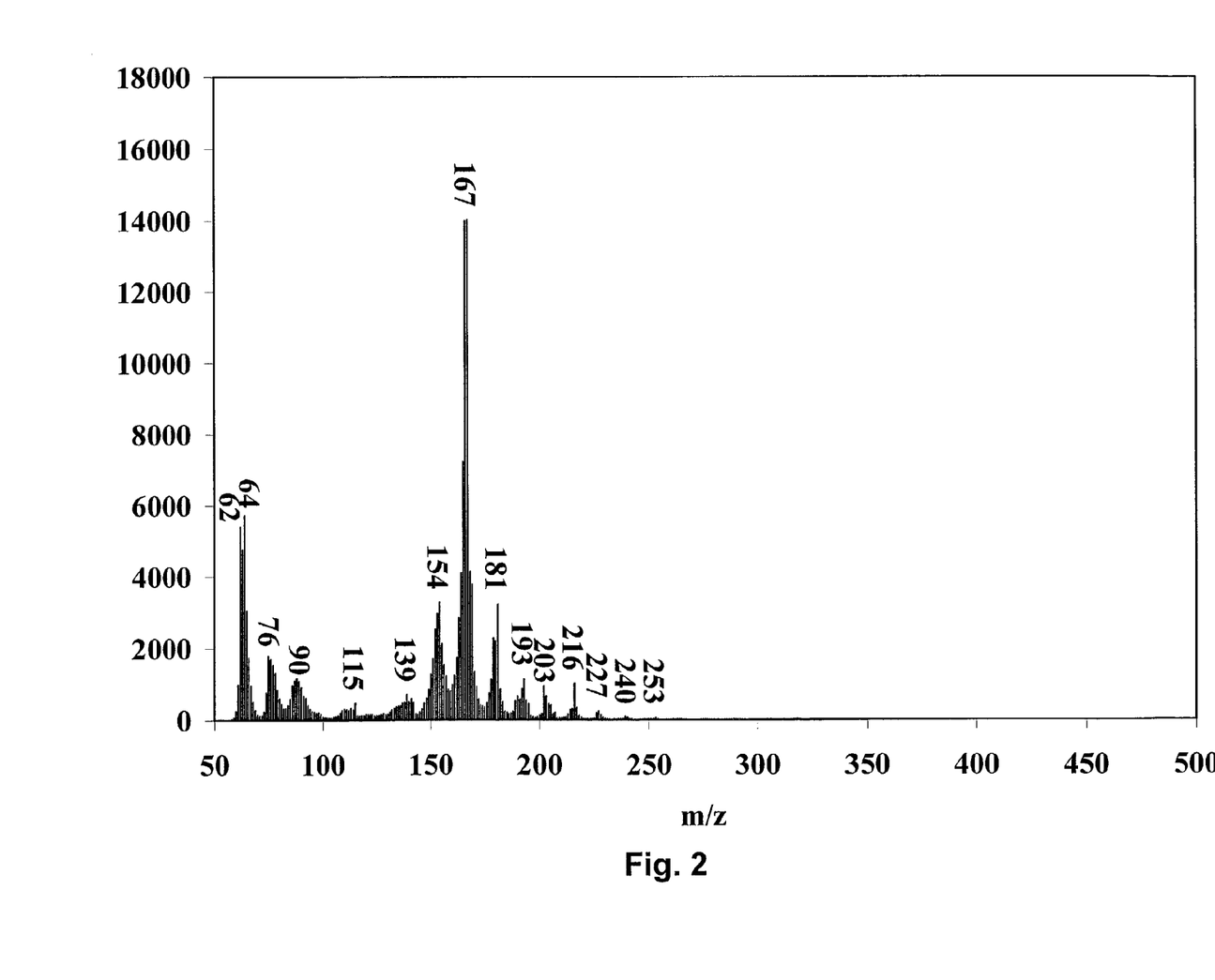
FIG. 2 shows the average of 494 individual particle mass spectra sampled from the one hundred fold diluted effluent of the 700° C. pyrolysis of acetylene.

The bizarre nature of precursor soot is demonstrated by examining the averaged mass spectra of the gas phase and the averaged mass spectra from the particle plus the gas phase. FIG. 1 shows the averaged mass laser ionization mass spectrum of the gas phase species obtained by deliberately mistiming the laser to avoid hitting the effluent particles from 501 laser shots. The gas phase spectrum shows a sparse and sharp distribution of PAHs and fragments. FIG. 2 shows the average of 494 individual particle mass spectra sampled from the one hundred fold diluted effluent of the 700° C. pyrolysis of acetylene. This average contains both hits and misses; therefore, it is an average of both the gas and particle phase spectra. Examination of the averaged particle mass spectrum (FIG. 2) in the ever-present gas phase background shows a very similar distribution with some subtle differences. The first obvious difference is a broadening of the local mass distribution around each of the PAH masses. This is attributed to rapid hydrogen exchange between the hydrocarbons in the particle phase. This is a condensed phase phenomenon. The second difference is the one mass unit shift in the mass distribution toward higher mass indicating a higher concentration of hydrogen in the particle phase.

The comparison of the gas and particle phase spectra disprove the suggestion that the micrometer-sized particles observed are the result of massive condensation of the gas phase PAHs during the dilution step. The comparison of the gas and particle phase spectra reveal that suggestion or explanation as violating the law of the conservation of mass due to the mass shift in the particle phase distribution. Furthermore, it has also been observed that the differences between the gas and particle phase spectra become more pronounced at higher temperatures. In the literature, a white mist (precursor soot) was observed to form inside an industrial furnace used to make carbon black for tires under similar conditions without sampling (Sweitzer et al, 1956). The results produced by the present invention and those in the literature gives the conclusion that the particles observed were created inside the flow tube reactor at 700° C. The fact that the boiling points of the observed species in the mass spectra and identified by GCMS of the filter-collected effluent are all several hundred degrees below the reactor temperature reveal that a vast amount of chemistry that is occurring in the condensed or particle phase of the reactor borne aerosol and that there is a change in the chemical nature of the precursor soot as it is cooled to room temperature. The chemistry results from a large concentration of radicals in the particle phase that is the consequence of rapid hydrogen exchange in the high temperature environment.

Figure 3A:
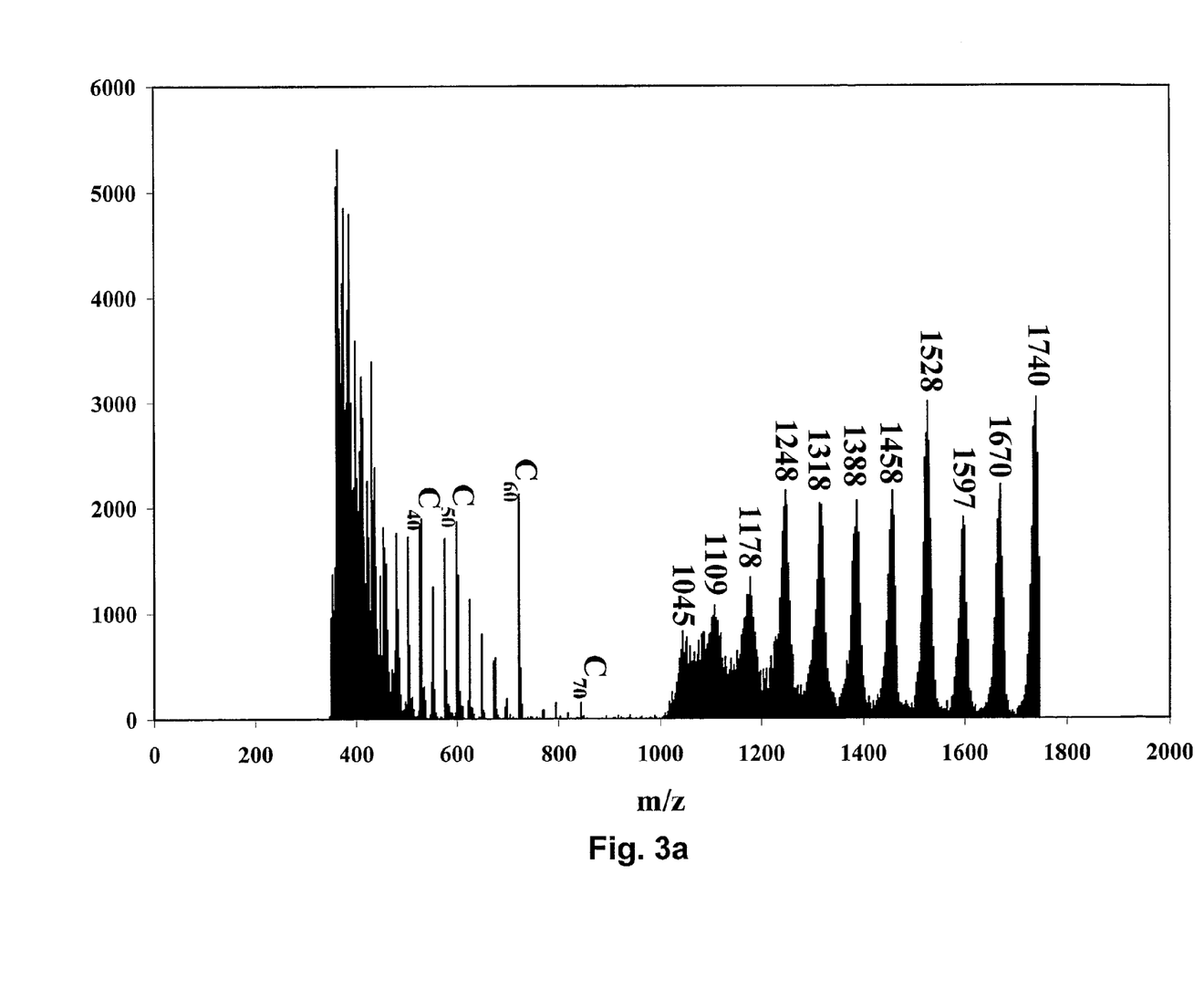
FIG. 3a shows the average of 357 real-time individual particle spectra scanned from 350 to 1750 Da at 700° C.
Figure 3B:
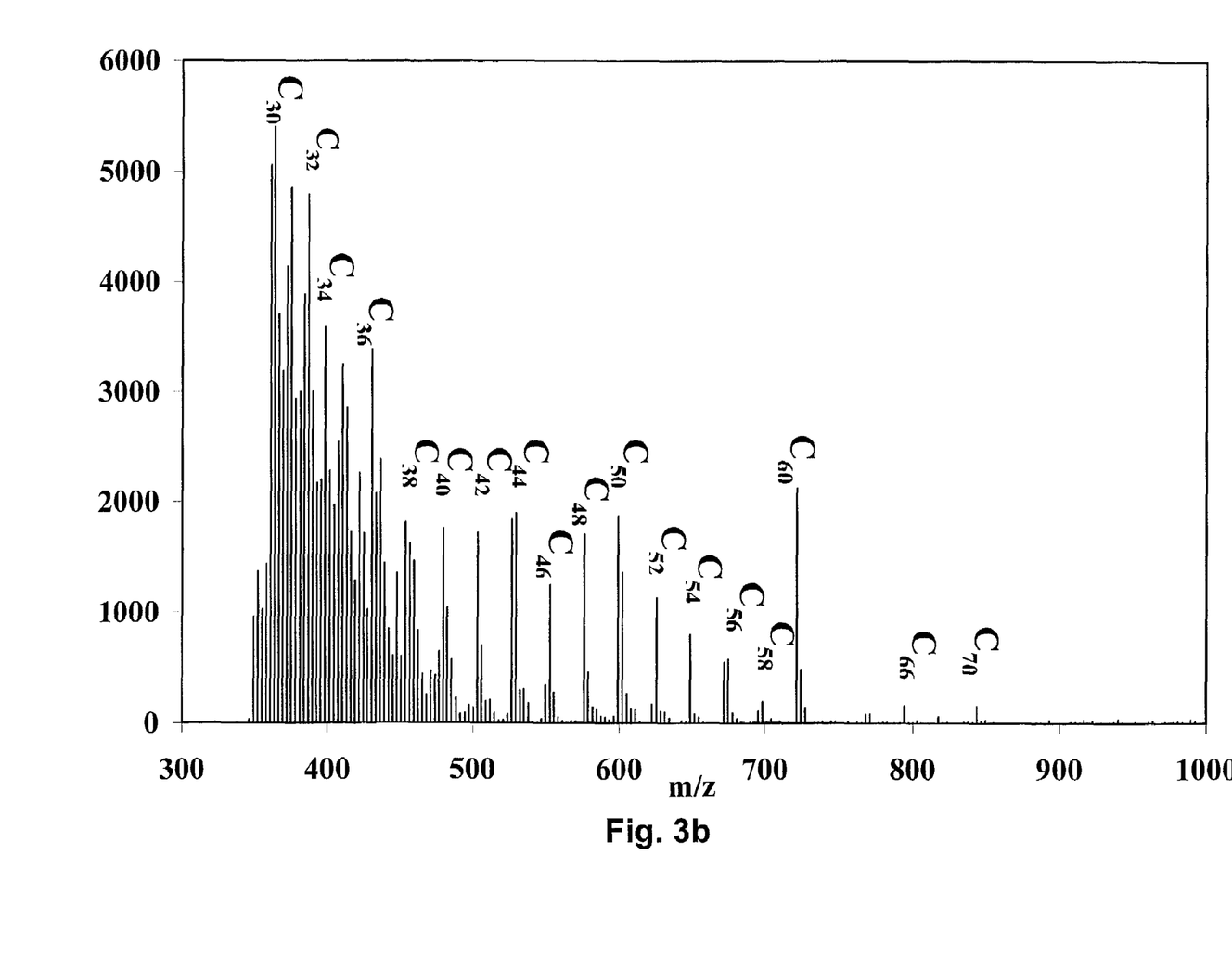
FIG. 3b shows the same averaged high mass spectrum of the particle phase as FIG. 3a, scanned from 350 to 850 Da.

Further proof of the chemistry occurring in the particle phase can be seen by examining the high mass region of the spectrum using resonant ejection from the ion trap. FIG. 3a shows the average of 357 individual particle spectra scanned from 350 to 1750 Da. No ion intensity was observed in this mass range for the gas phase species by electron impact or laser ionization. On the left side of the averaged spectrum, the tail end of the individual PAH distribution can be seen tapering off just above 400 Da. Emerging from the PAH distribution is another distribution of peaks evenly spaced by 24 Da. The dominant peak at 720 Da ($C_{60}$) marks it as a fullerene distribution. This evidence suggests that fullerenes are formed in or on the surface of the precursor soot particles, without the production or formation of carbonaceous soot. FIG. 3b shows the same averaged high mass spectrum of the particle phase scanned from 350 to 850 Da. The fact that no ion intensity was observed in this mass region in the gas phase suggests that the observed fullerene distribution was produced in the particle phase and not the gas phase.

Above 1000 Da in FIG. 3a, a polymer-like ion distribution was observed with a regular spacing of approximately $C_5H_n$, where n is near 10. The average local distribution about each of the "polymer-like" ion units is Gaussian and broad indicating rapid hydrogen exchange. No high mass species were found to exist in the gas phase using laser and electron impact ionization.

Figure 4:
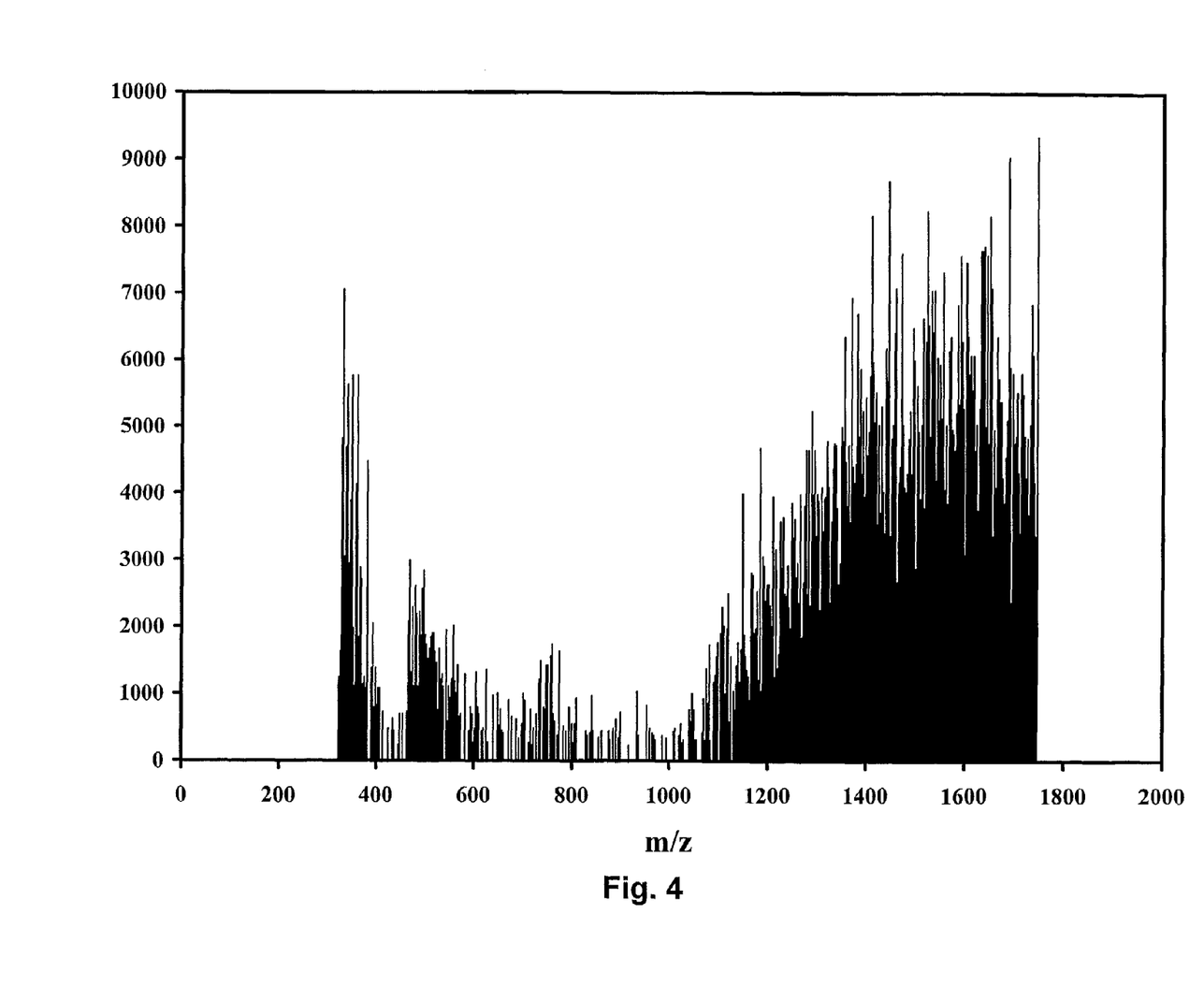
FIG. 4 shows the averaged off-line individual particle mass spectrum from the 700° C. effluent collected on a filter and deposited on C-18 coated silica beads.

Because mass spectrometry of filter extracts has been a routine part of combustion analysis for decades, off-line measurements were taken as well to observe the differences between real-time and off-line measurements. Therefore, C-18 coated 5-μm silica beads (standard liquid chromatography column packing) were deposited in the methylene chloride filter extract collected from the 700° C. pyrolysis process from Example 1. The methylene chloride was allowed to evaporate driving the C-18 soluble species into that medium. The dried particles were then dropped into the inlet of the aerosol mass spectrometer. The averaged individual particle mass spectrum from the 700° C. extractant doped C-18 coated silica beads is shown in FIG. 4. The blank C-18 coated silica beads yield no ion intensity in this mass region.

Comparison of the real-time and off-line results in FIG. 3a and FIG. 4 is enlightening. Because fullerenes are not particularly soluble in the C-18 medium, they do not appear in the off-line spectra. On the other hand, PAHs are soluble and therefore readily observed in the off-line spectra of the 700° C. pyrolysis extractant. The rest of the comparison is anything but typical.

The high mass species have maintained their spectral intensity relative to the PAH ions and there still is a noticeable onset just above 1000 Da. However, the polymeric ion distribution seems to be scrambled in the off-line data. Additionally, there is a noticeable build up of ion intensity just below 500 Da.

The observation of the scrambled high mass species is not matrix dependent. Similar spectra were observed when the filter extract was deposited on soil particles. This suggests that the high mass species are metastable and do not exist in typical off-line mass spectra of combustion extracts.

Figure 5A:
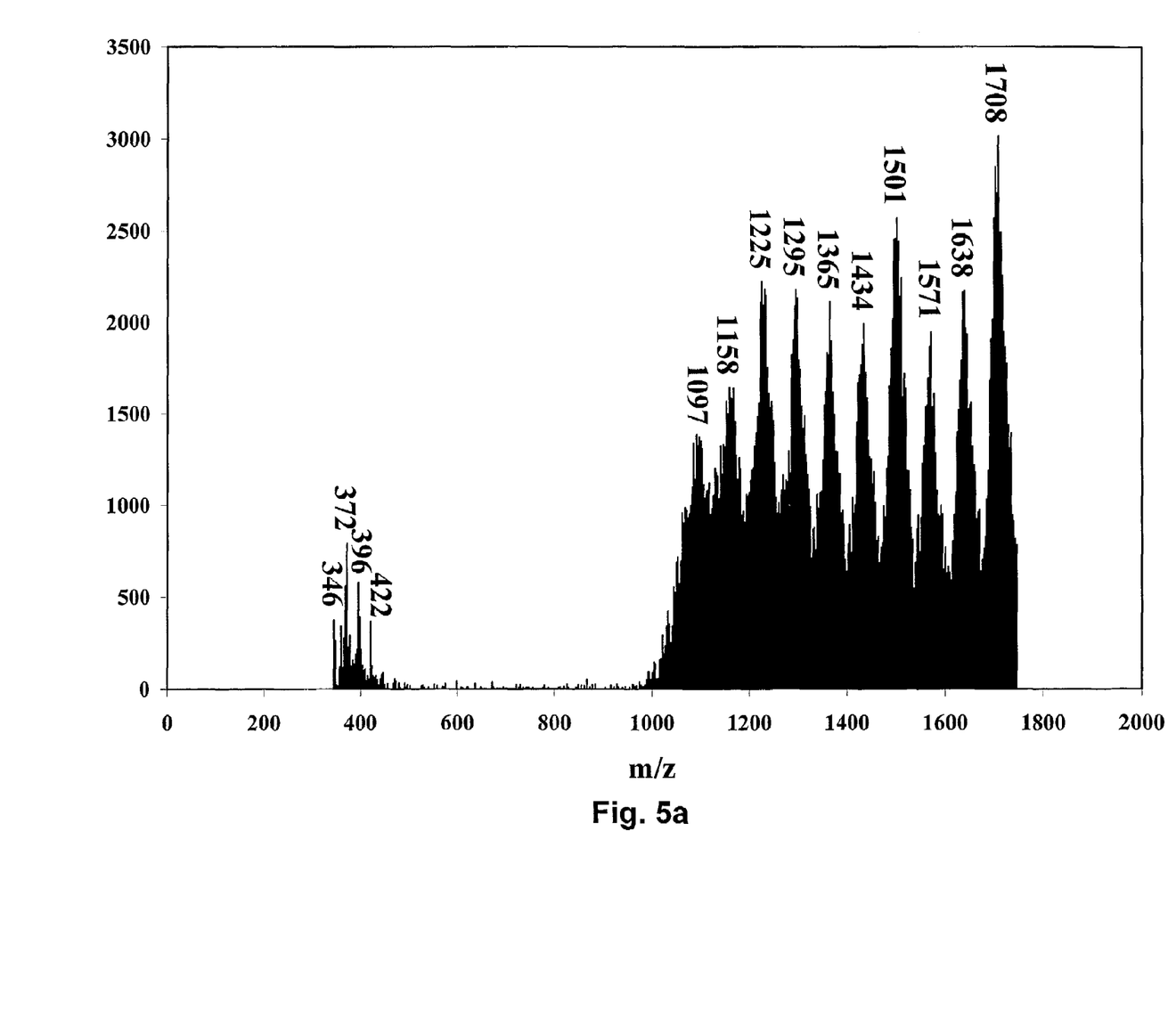
FIG. 5a shows the average of 357 real-time individual particle spectra scanned from 350 to 1750 Da at the 800° C. temperature.
Figure 5B:
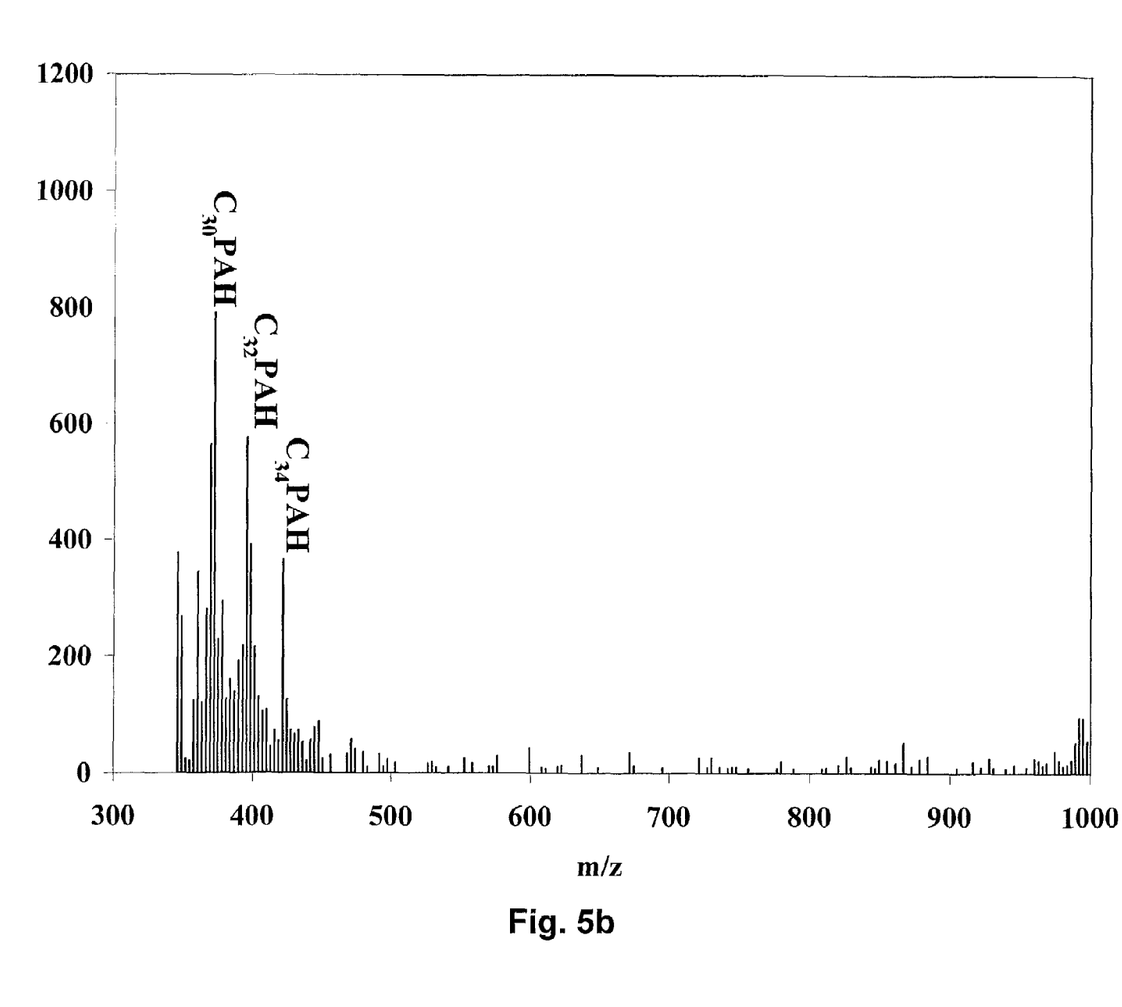
FIG. 5b shows the same average high mass spectrum of the particle phase as FIG. 5a, scanned from 350 to 1000 Da.

FIG. 5a shows the average of 357 individual particle spectra scanned from 350 to 1750 Da at the 800° C. temperature. In this FIG. 5a, it is noted that as compared with FIG. 3a at 700° C., the fullerene distribution has disappeared suggesting fullerene production is in competition with mature carbonaceous soot production. The distribution of the polymer-like high mass ions has changed as well with the increase in pyrolysis temperature. The $C_5H_n$ peak separation has not changed yet the distribution has shifted and the polymer-like peaks have a broader hydrogen distribution. At either temperature, no high mass species were found to exist in the gas phase using laser and electron impact ionization. FIG. 5b shows the average of 357 individual particle spectra scanned from 350 to 1000 Da.

Figure 6:
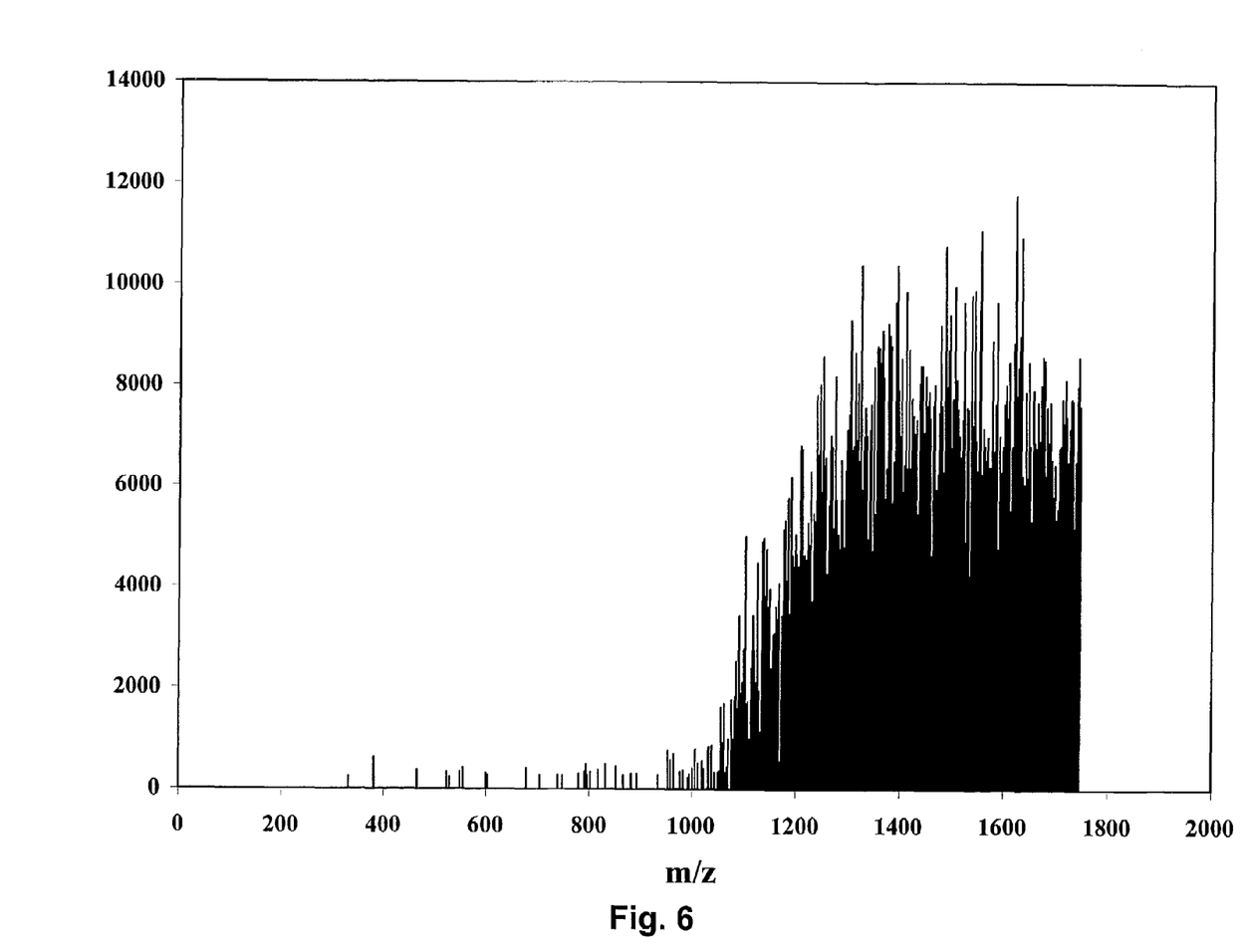
FIG. 6 shows the averaged off-line particle mass spectrum from the 800° C. effluent collected on a filter and deposited on C-18 coated silica beads.

These polymer-like high mass distributions have never been reported for any pyrolytic or combustion process by any off-line technique because these ionic species are apparently metastable. Laser desorption ionization (LDI) of the effluent extracted from the filter and deposited on a stainless steel probe yields no high mass ion intensity (1000 Da). When that same 800° C. extractant is deposited on 5-μm silica beads with a C-18 coating and the solvent evaporated, the mass spectra taken from these beads yields ion intensity above 550 Da, but the polymer-like beak distribution becomes scrambled, as seen in FIG. 6.

The observation of the production of fullerenes from the liquid phase has never been observed before. More importantly, these fullerenes were produced without co-production of carbonaceous soot or amorphous carbon. This was demonstrated above, after washing with methylene chloride, the filter returned to its original pristine white color. The filtrate solution was completely transparent without any particulate matter suspended in it. There were no insoluble species in the filtrate. Consequently, $C_{60}$ was produced and can be produced without soot.

In the previous discussion of the formation of fullerenes, it was suggested that the production of soot competed with the production of fullerenes. It was also suggested that if the leaving group (in this case hydrogen) was eliminated too quickly then soot production occurs and fullerene production should decrease. These suggestions were confirmed by raising the temperature of the flow reactor until black particulate matter (soot) was present in the effluent. FIG. 5 reveals the averaged high mass particle spectrum of the effluent of the 800° C. reactor. Here it was noted that when soot production begins in the particle phase, fullerene production ceases. These results are consistent with the too rapid removal of hydrogen from the vicinity of the rearranging carbon structure at the higher temperature making it energetically too difficult to convert to the more ordered fullerene structures.

Comparison of the gas and particle phase mass spectra (FIG. 1 and FIG. 2) reveals a greater degree of hydrogenation in the particle phase as evidenced by the most intense peak at 167 Da and others. Hydrogen exchange is also evident because of the local broadening in the PAH masses. The presence of the excess hydrogen and the evidence for hydrogen exchange suggests the presence of free radicals in the particle matrix.

In consideration of the state of a condensed phase of hydrocarbons at 700–800° C., at these temperatures, the condensed phase hydrocarbons rapidly exchange hydrogen in a concerted reaction that forms two free radicals for each hydrogen atom exchanged. Evidence of the hydrogen exchange is seen in the real-time particle mass spectra while off-line mass spectrometric techniques do not show this evidence. Moreover, free radicals are extremely reactive. This is especially true in the condensed phase. This means that the PAH radicals are continuously reacting with their neighbors and rearranging their own chemical structures. Under high temperature conditions, condensed phase hydrocarbons (i.e., precursor soot particles) should not be thought of as an agglomeration of individual molecules, rather the precursor particle should be thought of as a giant macromolecule or "radical plasma" whose internal structure is in a state of constant flux.

The growth rate of precursor particles depends on the concentration of free radicals. From the literature, we know that Koylu et al. (Koylu et.al., *Combustion and Flame*, 1997) used light scattering and TEM to simultaneously determine the soot volume fraction and particle morphology as a function of height in the flame. Their work suggests that the remarkable growth rate of soot particles can be attributed to the precursor particles. This suggests that the concentration of free radicals in precursor soot is relatively large. Any hydrocarbon that collides with the particle would have a high probability of forming a chemical bond with the particle. The hydrocarbon would subsequently be absorbed into the macromolecular structure by the continuous rearrangement. This means that the chemical species found in the cooled precursor soot are products of the decomposition of the "macromolecular" hot precursor soot particles that results when the thermally-induced hydrogen exchange ceases.

The data of the present invention has led to the conclusion that at high temperature, the precursor soot exists as a macromolecule composed of rapidly rearranging hydrocarbon radicals in continuous structural flux that occurs because of rapid hydrogen exchange. Upon removal from the high temperature environment, the high temperature form of precursor soot converts into the oil of PAHs that are typically observed in room temperature measurements. First, the hydrogen exchange ceases and the radicals are eliminated by radical-radical recombination. The diffusion of atomic hydrogen to the carbon free radical sites and the production of hydrogen gas ($H_2$) eliminate radicals. The elimination of the radicals is rapid and occurs without regard for overall thermodynamic stability. Standard rules for preserving stability, such as aromaticity, yield to the expedience of removing the radicals from the matrix. This is the origin of the high mass polymer-like species observed in FIG. 3a and FIG. 5a. This is also the reason for the metastable nature of these high mass species. With time and interaction with the environment, the metastable species convert into their most thermodynamically stable configuration, an oil of PAHs and other hydrocarbons.

Another demonstration of the chemistry occurring in precursor soot is the presence of the "polymeric" species that only exists above 1000 Da. The large mass gap between the PAHs and the polymeric species suggests that the stability of the polymer-like species is size related. Observation of the polymeric distribution shows the width of the polymer peaks decreases with increasing size. The size related threshold results from the formation of a three-dimensional structure. In other words, below 1000 Da, there is a tendency for forming planar structures that are not as stable.

Because PAHs and fullerenes are the only other species present in the mass spectra, it is concluded that the products of the decomposition of the polymeric species are primarily PAHs and other small hydrocarbons The precursor matrix has a lot of excess hydrogen in it. A medium that can rapidly exchange hydrogen can also store it. Preservation of the hydrogen means smaller PAHs in the measured particle phase distribution than in the gas phase distribution. It is also the reason that the observed composition of the tar fraction in soot is composed of alkyl and aromatic species and not just big aromatic molecules. The alkyl species are created with the excess hydrogen. Reducing the hydrogen concentration in the precursor matrix increases the size of the PAHs in the particle phase distribution. When the hydrogen concentration becomes too small, carbonization occurs.

The final evidence of the wealth of chemistry occurring in the precursor soot is the presence of the fullerenes. No fullerenes are observed in the gas phase by either laser or electron impact ionization. A large number of reactions are required to convert the hot hydrogen-rich precursor material into fullerenes. Both mature soot and fullerenes are produced from the same process, namely carbon skeletal rearrangement with concurrent dehydrogenation. Fullerenes are more stable and ordered than mature soot. The presence of the hydrogen facilitates the carbon rearrangement process, thus fewer dangling bonds. If the hydrogen is removed too rapidly, the carbon skeletal structure does not have sufficient time to rearrange itself into the most thermodynamically stable structure (fullerenes). The consequence of rapid removal of hydrogen from the precursor soot medium is the production of mature carbonaceous soot. This is the reason that the fullerenes are not observed in the 800° C. pyrolysis particle spectra. The method of the present invention however, provides for the production of fullerenes from precursor soot without the production of mature, carbonaceous soot, due to the ability to control the process conditions or parameters thereby controlling the hydrogen concentration of the gas phase and the carbon to hydrogen ratio of the reaction medium during the pyrolysis-induced rearrangement and dehydrogenation process, as discussed earlier.

The presence of the metastable high mass species is strong evidence of the macromolecular nature of precursor soot. This macromolecular nature is the reason for the high temperature stability of precursor soot. Upon cooling, it transforms into the oil of PAHs and other hydrocarbons that were observed in the figures. This means that there are two completely different mechanisms for the production of the PAHs whereas only the gas phase production mechanism has previously been considered in the literature.

Simultaneous measurements of gas and particle phase species have been made in real-time for the pyrolysis of acetylene. The gas and particle phase PAH distributions are very different. They indicate that a tremendous amount of chemistry is occurring in the condensed phase that has previously been ignored. The concept of rapid mass growth by physical condensation of gas phase species has been refuted. Polymer-like high mass species have been observed and were determined to be metastable by comparison with off-line techniques. Their presence and the high temperature stability of the precursor soot was explained to result from radical reactions that occur in the condensed phase due to thermally induced hydrogen exchange. Precursor soot provides a second mechanism for the production of PAHs, fullerenes and nanotubes.

The method of the subject invention produces fullerenes and carbon nanotubes in the precursor medium without producing carbonaceous soot if careful attention is given to the process parameters, such as temperature, hydrogen content of the feedstock and gas phase hydrogen concentration, to control the carbon to hydrogen ratio in the reaction medium. Upon cooling, the precursor medium forms in another liquid medium that is composed of PAHs and small hydrocarbons. This liquid medium is completely soluble in standard solvents and should be easily manipulated to form aligned nanotubes. Finally, the co-produced PAHs and other product hydrocarbons are recycled back into the reaction medium to minimize reactant waste and create a more efficient process. Everything that is produced by the pyrolysis process is soluble in standard solvents. Fullerenes and nanotubes can readily be extracted from the precursor reaction medium. All of the left over pyrolysis product can be recycled to make more precursor soot. This means that the present invention offers a very efficient process for the production of fullerenes and nanotubes. The addition of the appropriate catalysts into the precursor material will make nanotubes in the same highly efficient process as well, without producing carbonaceous material (i.e., soot). The method of the present invention also offers a very efficient process for the bulk production of precursor soot.

While there has been shown and described what are at present considered the preferred embodiments of the invention, it will be obvious to those skilled in the art that various changes and modifications can be made therein without departing from the scope of the invention defined by the appended claims.

What is claimed is:

1. A method for synthesizing fullerenes or nanotubes, comprising the steps of:
   a) providing a hydrocarbon fuel source into a reactor;
   b) pyrolyzing said fuel by heating to a sufficient temperature to transform said fuel to a condensed hydrocarbon liquid comprising phase, said condensed hydrocarbon comprising a mixture of a liquid and a solid phase, wherein throughout said pyrolyzing step said sufficient temperature remains sufficiently low to avoid spontaneous carbonization of said fuel source during said pyrolyzing step, and
   c) inducing dehydrogenation of said condensed hydrocarbon liquid comprising phase by continuing said heating at a temperature sufficiently low to avoid said spontaneous carbonization to form fullerenes or nanotubes.

2. The method of claim 1, wherein at least one of said steps b) and c) is performed at atmospheric pressure.

3. The method of claim 1, further comprising the step of reducing the rate of said dehydrogenation by raising a partial pressure of hydrogen above said condensed hydrocarbon.

4. The method of claim 1, further comprising the step of step of cooling said condensed hydrocarbon to form an oil of polyaromatic hydrocarbons and small hydrocarbons, said oil comprising said fullerenes or said nanotubes.

5. The method of claim 4, further comprising the step of extracting said fullerenes or said nanotubes from said oil.

6. The method of claim 1, wherein said fuel source comprises an alkane, an alkene, an alkyne, an aromatic compound, or a mixture thereof.

7. The method of claim 1, wherein said temperature of steps b) and c) ranges from 600° C. to 800° C.

8. The method of claim 1, wherein said fuel is acetylene and said temperature of steps b) and c) ranges from 600° C. to 700° C.

9. The method of claim 1, further comprising the step of controlling a removal rate of hydrogen gas above said condensed hydrocarbon during said dehydrogenation step.

10. A method for synthesizing fullerenes or nanotubes, comprising the steps of:
   a) providing a hydrocarbon fuel source into a reactor;
   b) pyrolyzing said fuel by heating to a sufficient temperature to transform said fuel to a condensed hydrocarbon liquid comprising phase, wherein throughout said pyrolyzing step said sufficient temperature remains sufficiently low to avoid spontaneous carbonization of said fuel source during said pyrolyzing step;
   c) inducing dehydrogenation of said condensed hydrocarbon liquid comprising phase by continuing said heating at a temperature sufficiently low to avoid said spontaneous carbonization to form fullerenes or nanotubes, wherein a metallic catalyst is added to said fuel source prior to said pyrolysis step or is added to said condensed hydrocarbon, wherein said catalyst undergoes pyrolysis to form metallic nanoparticles which provide a surface on which said nanotubes or said fullerenes grow.

11. A method for producing condensed hydrocarbon comprising phases, comprising the steps of:
   (a) providing a hydrocarbon fuel source into a reactor
   (b) pyrolyzing said fuel by heating to a sufficient temperature to transform said fuel to a condensed hydrocarbon liquid comprising phase, wherein throughout said pyrolyzing step said sufficient temperature remains sufficiently low to avoid spontaneous carbonization of said fuel source during said pyrolyzing step; and
   (c) collecting said condensed hydrocarbon comprising liquid comprising phase, wherein a metallic catalyst is added to said fuel source prior to said pyrolysis step.

12. The method of claim 11, wherein said step b) is performed at atmospheric pressure.

13. The method of claim 11, wherein said condensed hydrocarbon comprises a mixture of a liquid and a solid phase.

14. The method of claim 11, wherein said fuel source comprises an alkane, an alkene, an alkyne, an aromatic compound, or a mixture thereof.

15. The method of claim 11, wherein said temperature of step b) ranges from 600° C. to 800° C.

16. The method of claim 11, wherein said fuel is acetylene and said temperature of step b) ranges from 600° C. to 700° C.

* * * * *